UNITED STATES PATENT OFFICE.

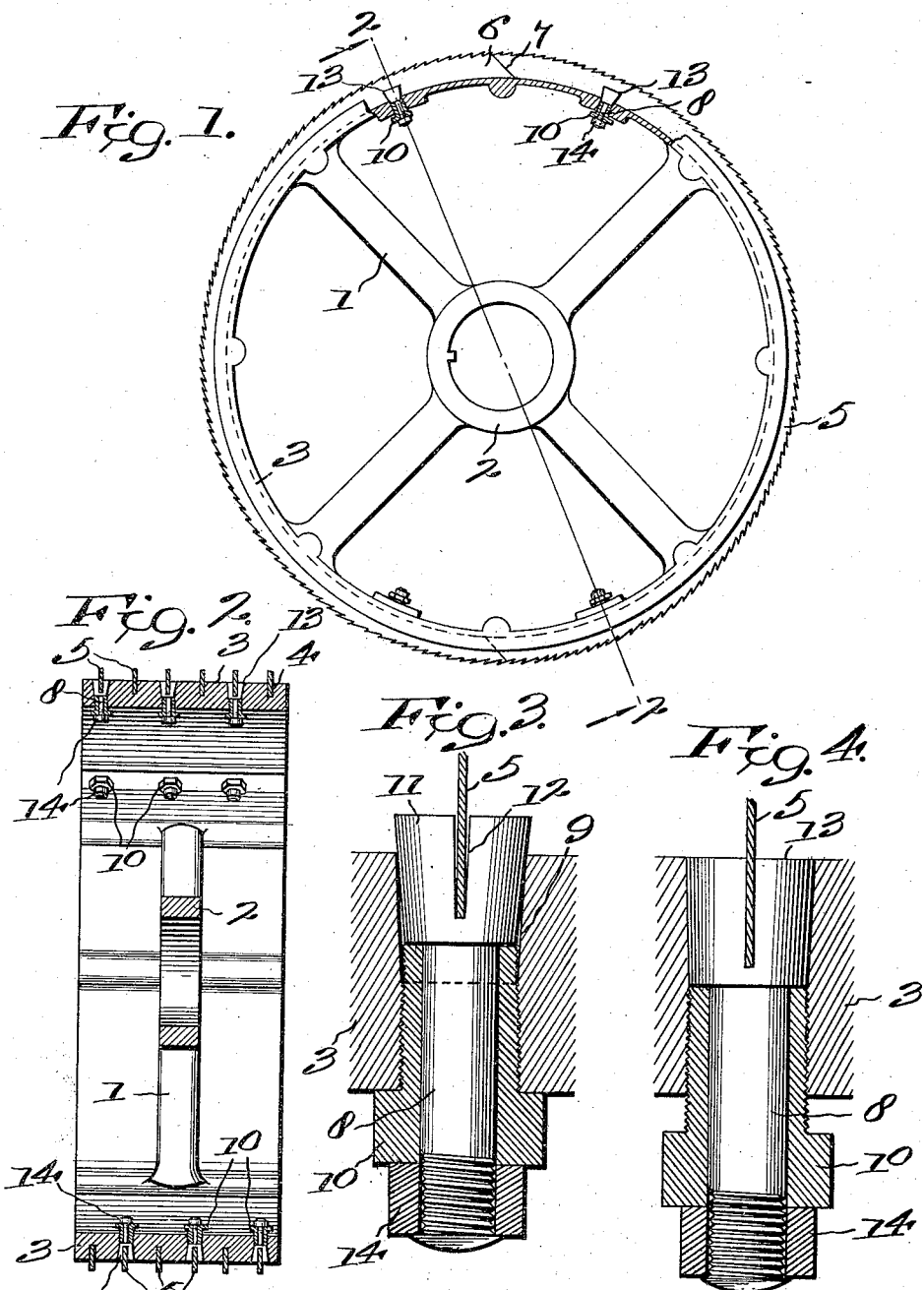

GEORGE L. BLANCHARD, OF MONTGOMERY, ALABAMA.

SAW AND SAW-CYLINDER FOR LINTERS AND COTTON-GINS.

1,161,831. Specification of Letters Patent. Patented Nov. 30, 1915.

Application filed January 22, 1915. Serial No. 3,797.

*To all whom it may concern:*

Be it known that I, GEORGE L. BLANCHARD, a citizen of the United States, residing at Montgomery, in the county of Montgomery and State of Alabama, have invented certain new and useful Improvements in Saws and Saw-Cylinders for Linters and Cotton-Gins; and I do hereby declare the following to be a full, clear, and exact description of the invention, such as will enable others skilled in the art to which it appertains to make and use the same.

The present invention relates to saws and saw cylinders for cotton gins, linters, and delinters, and has for its purpose to provide a construction of saw cylinder therefor made up of a plurality of axially assembled units, each carrying a plurality of saws, and which may be readily assembled and disassembled.

A further purpose of the invention is to produce a saw cylinder in which each unit is separate and distinct in itself, to the end of economy in production and simplicity of structure, and wherein the saw *per se* comprises a single circular strip having independent fastening means; and in which each saw strip has overhanging ends, thus giving a substantially unbroken saw edge.

It is further proposed to construct the several saws of the cylinder from the ring sections of a spirally wound strip after that manner disclosed in my co-pending application for U. S. Patent, bearing Serial No. 3982 and dated January 22d, 1915.

With these and other objects in view the invention consists in the novel details of construction and combinations of parts more fully hereinafter disclosed and particularly pointed out in the claims.

Referring to the accompanying drawings forming a part of this application, and in which similar reference symbols indicate corresponding parts in the several views: Figure 1 is an elevational view of the saw cylinder, partly broken away to show the saw strip fastening means. Fig. 2 is a transverse sectional view taken on the line 2—2 of Fig. 1, and looking in the direction of the arrows. Fig. 3 is a detail view of one of the saw strip fastening devices; and Fig. 4 is a similar view, and showing the same in secured position.

Referring to the construction and arrangement of parts in detail, the saw cylinder or unit of the cylinder consists of a wheel 1, having a hub 2 adapted to be keyed on the usual cylinder shaft, not shown, and which is formed with a relatively broad rim 3. A plurality of annular grooves 4 are formed in the face of the rim portion 3 at uniform distances apart, and each groove receives a circular strip saw 5 that is constructed from a single piece and has overhanging end portions 6 and 7, as shown in Fig. 1. The several units of the cylinder are axially assembled on the cylinder shaft to position the several saws with relation to the grooves or openings between the ribs of the grate.

Each saw strip has separate fastening means, to the end that any saw may be removed for re-sharpening or replacement at will, and said means consists of a pair of clamping bolts 8, located within radially-disposed openings 9 formed in the rim 3. Each clamping bolt 8 fits within a bushing 10 threaded within the aperture 9, and said bolt has a tapered head 11 formed with a slot 12 that receives the saw strip 5, and effects to clamp and draw said strip inwardly, thus giving an unbroken saw edge. The walls of the aperture 9, surrounding the head 11, are slightly inclined, in order that the top 13 of the head will meet flush with the outer surface of the rim, as shown in Fig. 4. The bolt 8 is adjusted by means of the nut 14 screw-threaded thereon and seating against the head of the bushing 10.

For convenience in assembling and removing the several saws of each unit, the fastening devices for the several saws are arranged in alternate arrangement, *i. e.* the fastening means for each saw strip is disposed diametrically opposite the securing bolts of the next adjacent strip, as clearly shown in Figs. 1 and 2.

It is obvious that those skilled in the art may vary the details of construction and arrangement of parts without departing from the spirit of my invention, and therefore I do not wish to be limited to such features except as may be required by the claims.

I claim:

1. In a saw for cotton gins and the like, the combination of an annular grooved member; a circular and split saw strip, constructed of a single piece and having overhanging ends, fitting in said groove; and a pair of clamping bolts engaging the respective ends of said saw strip and securing the same in said groove, substantially as described.

2. In a saw for cotton gins and the like, the combination of an annular grooved member; a circular and split saw strip, constructed of a single piece and having overhanging ends, fitting in said groove; and a pair of bolts, having slotted and tapered heads, carried by said annular member and engaging the respective ends of said saw strip and securing the same in said groove, substantially as described.

3. In a saw for cotton gins and the like, the combination of an annular grooved member; a circular and split saw strip, constructed of a single piece and having overhanging ends, fitting in said groove; and a pair of radially-disposed bolts located in recesses in said annular member, said bolts having tapered heads formed with slots receiving the respective ends of said saw strip and securing the same in said groove, substantially as described.

4. In a saw cylinder, the combination of a wheel having a relatively broad rim formed with a plurality of annular grooves; a plurality of circular and split saw strips, constructed each of a single piece, located in said grooves; the adjoining ends of each saw strip being located diametrically opposite the adjoining ends of the next adjacent strip; and diametrically opposed pairs of clamping bolts engaging the respective ends of said saw strips and securing the same in said grooves, substantially as described.

In testimony whereof, I affix my signature, in presence of two witnesses.

GEORGE L. BLANCHARD.

Witnesses:
 EDWIN J. BELLER,
 R. M. PARKER.

Copies of this patent may be obtained for five cents each, by addressing the "Commissioner of Patents, Washington, D. C."